April 25, 1939.  G. A. TINNERMAN  2,156,002

FASTENING DEVICE

Original Filed Dec. 3, 1936

INVENTOR.
GEORGE A. TINNERMAN
BY Bates, Golrick & Teare
ATTORNEYS

Patented Apr. 25, 1939

2,156,002

UNITED STATES PATENT OFFICE 2,156,002

FASTENING DEVICE

George A. Tinnerman, Rocky River, Ohio, assignor to Albert H. Tinnerman, Cleveland, Ohio Original application December 3, 1936, Serial No. 113,949. Divided and this application March 28, 1938, Serial No. 198,345

4 Claims. (Cl. 189—36)

This invention is a division of my copending application, Serial No. 113,949, filed December 3, 1936, since issued as Patent Number 2,117,775, May 17, 1938 and relates to threadless fasteners, or to means for fastening one or more threaded members to a supportng plate, wherein the head of the threaded member acts to hold one or more pieces of an assembly to the plate. Supports of this character have heretofore been assembled by the use of separate fastening devices, such as threaded nuts or strips of wood which have been mounted behind the supporting plate, and which have been adapted to be pierced by the threaded member.

An objection to the use of a threaded nut in a plate assembly is that it necessitates a rigid connection between the nut and plate, such as by a riveting or welding operation, while an objection to the use of wood is the expense and the difficulty of properly securing the wood in place. Moreover, wood lacks the permanency of metal.

Heretofore, an effort has been made to produce fasteners by extruding metal from the plate to form the fastener. Where the metal has been relatively soft, however, the resulting fastener has lacked the desired mechanical strength, because the extruded portion could not be hardened independently of the plate. The lack of strength in the metal would allow the fastening portion to be pulled through the plate whenever excessive pressure was placed upon the threaded member.

An object of the present invention is to make a threadless fastener which is so formed that it cannot readily be pulled through the plate notwithstanding the fact that the plate is made of relatively soft metal, such as annealed metal. My invention, however, is equally well adapted for use in connection with fasteners that are made from hardened metal, as it increases the strength of the fastener.

Figure 1:
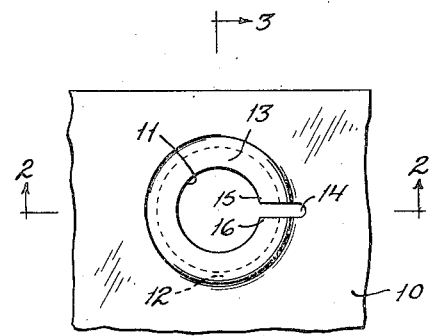
Figure 3:
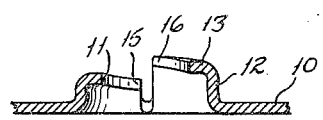
Figure 2:
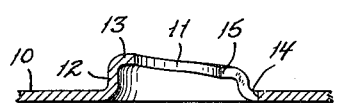
Figure 4:
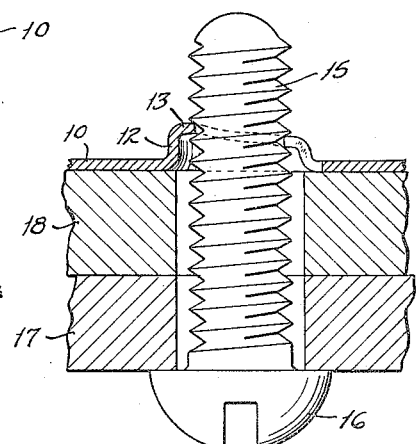
Figure 5:
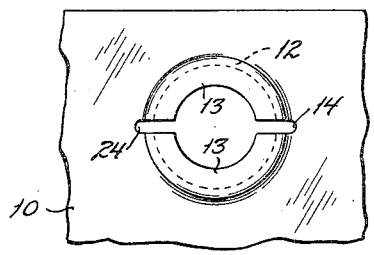
Figure 6:
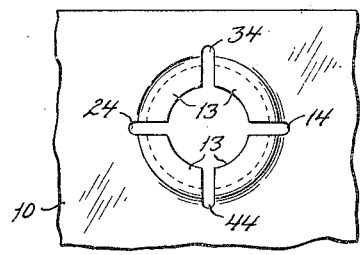
Figure 7:
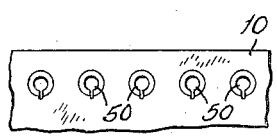

Referring now to the drawing, Fig. 1 is a top plan view of a plate having a threadless fastener formed thereon in accordance with my invention; Figs. 2 and 3 are sections taken on the correspondingly numbered lines in Fig. 1; Fig. 4 is an enlarged sectional view taken through the fastener and illustrating it in assembly position; Figs. 5 and 6 are top plan views illustrating modifications of the fastener construction, and Fig. 7 is a top view of a plate illustrating the use of the fasteners, which are extruded in multiple therefrom.

The fastener which I have devised is illustrated in connection with a body portion 10 which has an aperture 11 therein for receiving the shank of a threaded member. The metal surrounding the aperture is extruded from the body in such manner as to provide a wall 12 which extends around the aperture and substantially at right angles to the plane of the body portion. The periphery of the wall may terminate in an inwardly extending flange 13 which is adapted to coact with the threaded member. The wall 12 and the flange 13 are shaped to conform to the helix of a thread, and to this end, the body is notched radially from the aperture as at 14, thus providing tongues 15 and 16 which are at different elevations with respect to the body portion, the difference corresponding to the pitch distance of the thread on the member with which the fastener is intended to be used.

In Fig. 4, the fastener is illustrated in connection with a threaded bolt 15, the head 16 of which bears against the article 17 which is apertured to receive the shank of a bolt, while another article designated at 18 is interposed between the article 17 and the plate 10.

In the illustration such as that indicated in Fig. 4 the plate 10 may have one or more fasteners formed thereon and may be rigidly attached to any supporting surface; thereupon the articles such as those designated at 17 and 18, may be fastened to the plate even though the fastener part is positioned in a blind location. By having the wall 12 of the fastener portion extending in the same general direction, as the axis of the shank on the threaded member, any force which is exerted upon the fastener in a direction tending to pull the flange 13 through the plate will be resisted by the wall 12. This construction adds greatly to the mechanical strength of the fastener, notwithstanding the fact that the body of the fastener may be made of soft metal.

The modification of Fig. 5 differs from that shown in Fig. 1 in that the body of the fastener has two diametrically opposed notches 14 and 25 instead of one notch, while the modification of Fig. 6 has four notches, as shown at 14, 24, 34 and 44, all of which may extend radially and may be spaced apart a distance of ninety degrees. Notwithstanding the fact that one or more notches are used in the various modifications, nevertheless the wall construction 12 and the flange construction 13 are substantially the same in all forms. The notches in the modification of Fig. 6 are so placed that when the fastening member 15 is tightened, the segments between the notches have a tendency to draw in towards the root of the thread on the threaded member, thereby giving additional frictional contact so as to prevent ready loosening as a result of vibration during use. Fig. 7 shows a plate 10 which has fasteners made in accordance with my invention and extruded in multiple therefrom and indicated in general at 50.

The fastener which is made in accordance with the present invention has a decided commercial advantage in that it may be extruded in multiple from a plate notwithstanding the fact that the plate is made of unhardened metal and that the fasteners so made will have sufficient strength to withstand or resist the tendency of a threaded member to pull it through the plate. If desired, the same form of fastener may be made in small individual units, it being understood that the size of the body portion is not limited in any respect.

I claim:—

1. In combination with a part having a bolt passage, a sheet metal structure provided with bolt engaging means struck and formed therefrom to project out of the plane thereof and designed for self locking threaded engagement with a bolt joining said part and sheet metal structure, said bolt engaging means being in the form of a hollow protuberance comprising an upstanding wall of a size not less than the cross-sectional area of the bolt passage, said upstanding wall including an inturned bolt thread engaging element for engaging a single thread of said bolt and in operative position being in substantial registration with the side walls of the bolt passage to be supported by the surfaces of said part adjacent the bolt passage incident to the axial drawing action of said bolt, whereby said bolt thread engaging element is prevented from being pulled into and through the opening presented by the bolt passage in said part upon tightening of the bolt.

2. In combination with a part having a bolt passage, a sheet metal structure provided with bolt engaging means struck and formed therefrom to project out of the plane thereof and designed for self locking threaded engagement with a bolt joining said part and sheet metal structure, said bolt engaging means being in the form of a hollow protuberance comprising an upstanding wall of a size not less than the cross-sectional area of the bolt passage, said upstanding wall including an inturned flange providing a bolt thread engaging element in the form of a helix corresponding substantially to that of the threads of the bolt for engaging a single thread of said bolt, said upstanding wall in operative position being in substantial registration with the side walls of the bolt passage to be supported by the surfaces of said part adjacent the bolt passage incident to the axial drawing action of said bolt, whereby said bolt thread engaging element is prevented from being pulled into and through the opening presented by the bolt passage in said part upon tightening of the bolt.

3. In combination with a part having a bolt passage, a sheet metal structure provided with bolt engaging means struck and formed therefrom to project out of the plane thereof and designed for self locking threaded engagement with a bolt joining said part and sheet metal structure, said bolt engaging means being in the form of a hollow protuberance comprising an upstanding substantially cylindrical wall of a size not less than the cross-sectional area of the bolt passage, said substantially cylindrical wall including an inturned bolt thread engaging element for engaging a single thread of said bolt and in operative position being in substantial registration with the side walls of the bolt passage to be supported by the surfaces of said part adjacent the bolt passage incident to the axial drawing action of said bolt, whereby said bolt thread engaging element is prevented from being pulled into and through the opening presented by the bolt passage in said part upon tightening of the bolt.

4. In combination with a part having a bolt passage, a sheet metal structure provided with bolt engaging means struck and formed therefrom to project out of the plane thereof and designed for self locking threaded engagement with a bolt joining said part and sheet metal structure, said bolt engaging means being in the form of a hollow protuberance comprising an upstanding substantially cylindrical wall of a size not less than the cross-sectional area of the bolt passage, said upstanding substantially cylindrical wall including an inturned flange providing a bolt thread engaging element arranged in the form of a helix corresponding substantially to that of the threads of the bolt for uniform threaded engagement therewith, said upstanding substantially cylindrical wall in operative position being in substantial registration with the side walls of the bolt passage to be supported by the surfaces of said part adjacent the bolt passage incident to the axial drawing action of said bolt, whereby said bolt thread engaging element is prevented from being pulled into and through the opening presented by the bolt passage in said part upon tightening of the bolt.

GEORGE A. TINNERMAN.